United States Patent
Haslock et al.

(10) Patent No.: US 6,348,657 B1
(45) Date of Patent: Feb. 19, 2002

(54) POWER CORD SEALING GROMMET AND THE LIKE

(76) Inventors: John Haslock, 305 W. Front St., Buchanan, MI (US) 49107; Craig Nowicki, 50900 Ashford La.; Paul Schuchman, 50748 Andover Trail, both of Granger, IN (US) 46530

(*) Notice: Subject to any disclaimer, the term of this patent is extended or adjusted under 35 U.S.C. 154(b) by 0 days.

(21) Appl. No.: 09/347,557

(22) Filed: Jul. 6, 1999

(51) Int. Cl.$^7$ .................................................. H02G 3/18
(52) U.S. Cl. .......................... 174/65 G; 174/153 G; 174/152 G; 16/2.1
(58) Field of Search .............................. 174/37, 65 G, 174/77 R, 135, 151, 152 G, 153 G; 277/188 R; 417/363; 34/242; D8/356; 16/2.1, 2.2

(56) References Cited

U.S. PATENT DOCUMENTS

| | | | | |
|---|---|---|---|---|
| 3,825,148 A | * | 7/1974 | Hunter et al. | 174/37 |
| 5,052,699 A | * | 10/1991 | Tucket | 174/153 G |
| 5,056,801 A | * | 10/1991 | Beadie | 277/188 R |
| 5,540,450 A | * | 7/1996 | Hayashi et al. | 174/65 R |
| 5,686,700 A | * | 11/1997 | Carpinella | 174/65 R |
| 5,736,677 A | * | 4/1998 | Sato et al. | 174/152 G |
| 5,811,728 A | * | 9/1998 | Maeda | 174/65 R |
| 5,836,048 A | * | 11/1998 | Rossman et al. | 174/153 G |
| D403,949 S | * | 1/1999 | Nakamura | D8/356 |
| 5,856,635 A | * | 1/1999 | Fujisawa et al. | 174/153 G |
| 5,964,579 A | * | 11/1999 | Tang et al. | 417/363 |
| 6,081,964 A | * | 7/2000 | Mori | 174/65 R |
| 6,088,874 A | * | 7/2000 | Nakata et al. | 174/153 G |

OTHER PUBLICATIONS

James F. Shackelford, Introduction to Material Science for Engineers 1996, 4th, pp. 271 and 274–280.*

* cited by examiner

Primary Examiner—Dean A. Reichard
Assistant Examiner—Angel R. Estrada
(74) Attorney, Agent, or Firm—Ryan F. Fountain

(57) ABSTRACT

A power cord grommet is provided having a compressible, reverse tapered portion that is insertable into the power cord opening of a sewage or sump basin cover and expandable therein when subjected to higher fluid pressures from within the sump basin so as to form a tighter seal against that opening. That expandability under higher fluid pressure is facilitated by a plurality of tapered recesses in the bottom surface of the grommet adjacent the reverse tapered portion. A hole is provided in the grommet to receive the power cord, and a slit is cut from the hole to the side of the grommet to allow the cord to be inserted into the hole.

8 Claims, 1 Drawing Sheet

POWER CORD SEALING GROMMET AND THE LIKE

BACKGROUND AND SUMMARY OF THE INVENTION

The present invention relates generally to fittings and containers for maintaining fluid under pressure, and, more particularly, to sewage ejector basins or sump arrangements that must be capable of maintaining fluid under pressure therein for a period of time.

Various prior devices are known which are required to receive and retain therein for a period of time fluid which is under pressure. One such type of device is a sewage ejector basin or sump arrangement. Such sump arrangements will typically have an open topped sump container and a submersible electric pump or similar device mounted within it to remove fluid that accumulates in the sump container. Usually, it is desirable to seal the pump within the sewage or sump container by a cover and prevent fluid leakage out of the container through the cover. At the same time, it is often necessary for the pump to have access to a source of electric power via a power cord passing through an opening in the cover.

In order to satisfy certain reliability standards (such as with respect to downstream blockage) for some sump applications, an example being the ten foot stack test widely used in the sewage industry, the seals employed by the cover, particularly those about the power cord opening, must prevent leakage under significantly greater fluid pressure than the sump arrangement is subjected to under conditions of normal use. At the same time, the seals must not crimp the power cord or make the power cord unduly difficult to insert through the cover.

Previously, steel or other metals have been used for the sump container and/or cover. Such metal covers have, for example, been sufficiently rigid as to minimize cover flexing when subjected to higher fluid pressures. Minimizing the flexing of the cover tends to impose less stress on the cover seals and reduce any tendency of the cover seals to leak. With metal covers used in applications requiring sealing against higher pressures, the opening for the power cord has been sealed by an inwardly tapered, elastomeric grommet that can be secured in place by pounding it into the power cord opening to form an interference fit directly or with the aid of gasket tape. However, metal covers tend to be more expensive to manufacture, heavier to transport and more cumbersome to install *than is otherwise desired. Further, metal covers are susceptible to corrosion, especially in certain fluid environments where sump and sewage arrangements have been employed.

It has been suggested to form the sump container and/or the cover from plastic materials, such as polyethylene structural foam, so as to reduce manufacturing costs and weight and simplify installation. However, under higher fluid pressures, such plastic covers have a greater tendency to flex or bulge outwardly. That flexing tends to weaken the interference fit seal and permit leaks past the inwardly tapered, elastomeric grommet in the power cord opening.

In addition, some prior power cord grommets have been molded to have an hole to receive the power cord and a molded slot or groove to allow the power cord to be pushed into that hole from the side of the grommet. After the cord was inserted into the grommet, the grommet would be inserted into the power cord opening of the cover. Under normal conditions of use, the elasticity of the material used to form the grommet, such as flexible PVC, was such that upon compression of the grommet to form the interference fit, the slot was closed and prevented fluid flow therethrough. However, it has been found that in higher pressure applications that compression was insufficient to maintain the seal in the slot, and fluid could leak through the slot.

Accordingly, it is an object of the present invention to provide improved sewage and sump arrangements. Other objects include the provision of an improved sealing grommet for sump covers that:

a. Is inexpensive to manufacture and easy to install, b. Reliably seals against fluid flow past the power cord over a wide range of fluid pressures, even where the cover experiences flexing under the fluid pressure, c. Is usable in a wide variety of applications and with both metal and plastic covers, d. Provides a more secure seal at higher pressures, and e. Is durable, readily removable and reusable.

These and other objects of the present invention are attained by the provision of a power cord grommet having a compressible, reverse tapered portion that is insertable into *the power cord opening of a sewage or sump basin cover and expandable therein when subjected to higher fluid pressures from within the sump basin so as to form a tighter seal against that opening. That expandability under higher fluid pressure is facilitated by a plurality of tapered recesses in the bottom surface of the grommet adjacent the reverse tapered portion. One or more holes can provided in the grommet to receive the power cord, and a slit is cut from each such hole to the side of the grommet to allow the cord(s) to be inserted into the hole(s).

Other objects, advantages and novel features of the present invention will be readily apparent from the following drawings and description of preferred embodiments.

DETAILED DESCRIPTION OF PREFERRED EMBODIMENTS

Figure 1:
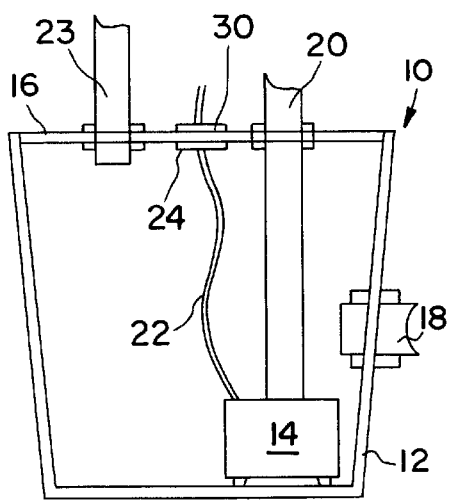
FIG. 1 shows a cross-sectional side view of a generalized sewage ejector basin or sump arrangement incorporating the present invention.

FIG. 1, which illustrates a preferred embodiment of the present invention, shows a sewage ejector basin or sump arrangement 10 with an open topped container 12 for receiving fluid, an electrical device 14, such as a submersible sump pump, mounted within container 12, and a cover 16 for closing the top of container 12 and sealing fluid within container 12. An inlet pipe 18 is included to extend through either cover 16 or a side of container 12 and provide fluid to container 12. An outlet pipe 20 is provided to extend from device 14 to the top or side of container 12 and permit fluid to leave container 12. A power cord 22 is provided which is attached at one end to device 14 in order to supply electric power to device 14 from a source of electricity outside of container 12. Cover 16 includes an opening 24 therein, which is, for example, circular in configuration, for receiving the free end of power cord 22 and permitting it to leave container 12. Grommet 30 is provided to receive power cord 22 and seal opening 24 by insertion of a portion of grommet 30 into opening 24. Further, if desired for certain applications a vent pipe 23 can be provided which extends through cover 16.

The material used to form container 12 and cover 16 can be of any conventional nature, but polyethylene structural foam is employed for both elements in preferred embodiments of the present invention. It should be understood, however, that the power cord grommet of the present invention has the advantage of being also employable with steel or like metal covers. Cover 16 includes fluid sealing means of a conventional nature when mounted on container 12 to restrict fluid leakage out of container 12. Although only a single device 14, inlet pipe 18 and outlet pipe 20 are illustrated, when desired in particular applications of the present invention more than one of any or all of those elements can be readily employed, or device 14 can be omitted altogether. Further, although device 14 is described above as electrical in nature, the present invention also contemplates use with devices driven by other remote power sources, such as fluid pressure or flow.

It will be readily understood that the fluid pressure within container 12 can vary according the relative rates of fluid flowing through inlet 18 and outlet 20. For example, when a blockage occurs or is created with respect to outlet 20, continue fluid flow and/or pressure from inlet 18 will cause relatively higher fluid pressures within container 12.

Figure 2:
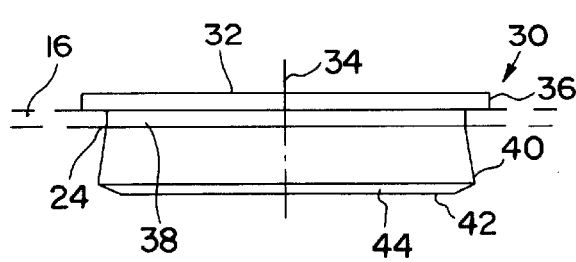
FIG. 2 shows an enlarged side view of the power cord grommet of FIG. 1, with the adjacent portions of the sump cover shown in dashed lines.
Figure 5:
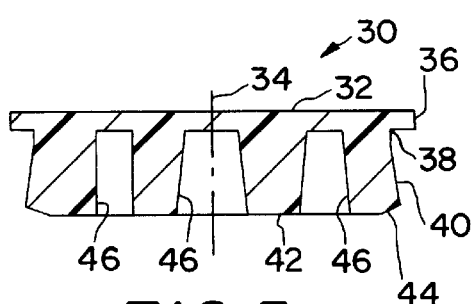
FIG. 5 shows a cross-sectional side view of the power cord grommet of FIG. 2, as taken along line A—A of FIG. 4.
Figure 3:
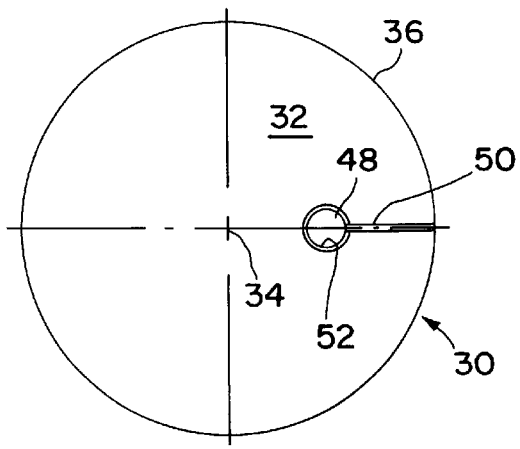
FIG. 3 shows a top view of the power cord grommet of FIG. 2
Figure 6:
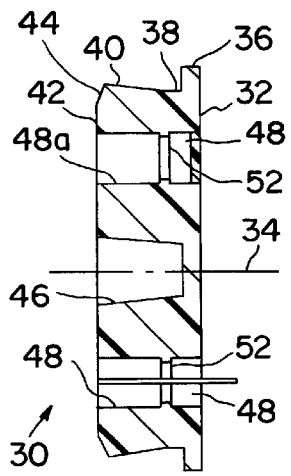
FIG. 6 shows a cross-sectional side view of the power cord grommet of FIG. 2, as taken along line B—B of FIG. 4.
Figure 4:
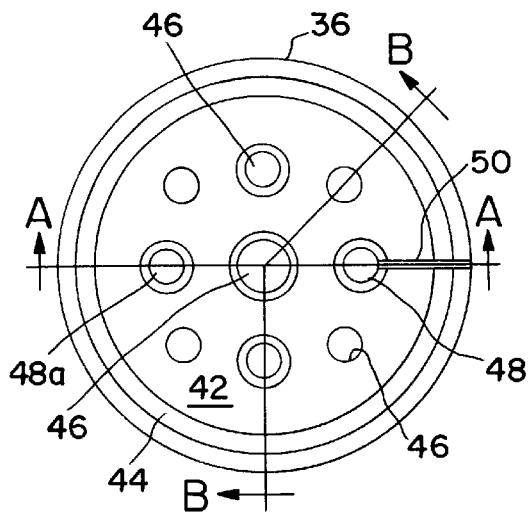
FIG. 4 shows a bottom view of the power cord grommet of FIG. 2

Grommet 30 is preferably configured to correspond to the shape of opening 24. For example, where opening 24 is generally circular, grommet 30 is generally cylindrical in configuration, having a top surface 32 and a bottom surface 42 which are spaced apart along longitudinal axis 34, as illustrated in FIG. 2. Flange 36 is formed at and immediately below top surface 32 to extend radially outward from axis 34. Flange 36 is, for example, dimensionally larger than opening 24 so as to restrict passage of the grommet completely through opening 24.

Grommet 30 includes a waist portion 38, preferably adjacent and below flange 36. Waist portion 38 is, for example, dimensioned to correspond closely to the dimension of opening 24 so as to allow it to fit snugly within opening 24 when the grommet is inserted into that opening. The longitudinal length or thickness of flange 36 and waist portion 38 can, for example, be nearly the same and may or may not be comparable to the thickness of cover 16.

Grommet 30 also includes a reverse tapered portion 40, preferably between waist portion 38 and bottom surface 42. Reverse tapered portion 40 extends radially outward with respect to axis 34 past the waist portion and the dimension of opening 24, although preferably not so far radially outward during normal fluid pressure situations as flange 36 extends. In preferred embodiments of the present invention, the angle of taper of reverse tapered portion 40 with respect to axis 34 is approximately 7 to 10 degrees.

Inward tapered portion 44 is formed about the radial periphery of bottom surface 42 so as to facilitate insertion of the lower portion of grommet 30 into opening 24. In preferred embodiments of the present invention, the angle of taper of inward tapered portion with respect to axis 34 is approximately 23 degrees.

Grommet 30 is, for example, formed with a plurality of recesses 46 in bottom surface 42 which extend toward top surface 32, but do not pass completely through grommet 30. Preferably, recesses 46 are formed as tapered openings that are larger in dimension at bottom surface 42. For example, recesses 46 can be formed as truncated cones having a 5 degree taper with respect to axis 34. Recesses 46 can be of difference sizes according to the degree of compressibility and expandability desired for grommet 30 with a given material used to form grommet 30. Preferably, grommet 30 is molded from flexible PVC material. Recesses 46 can also be formed from a combination of tapered and untapered openings, if so desired for a particular application. As a general principle, however, it is believed to be advantageous to have the surface area of recesses greater in a longitudinal direction than a radial direction (with respect to axis 34) so as to provide greater side to side expansion pressure than pressure along axis 34. Also, as a general principle in terms of the number of recesses in a given grommet, the mass to space ratio in reverse tapered portion should be sufficient to maintain the rigidity needed to preserve structural integrity with the particular material selected for grommet 30 and yet maintain sufficient compressibility to allow functionality for the particular application.

Grommet 30 can include a hole 48 for receiving therein power cord 22. If more than one device 14 is employed within container 12 or if device 14 uses more than one power cord, then more than one hole 48 can be formed in grommet 30. Similarly, if no device 14 is employed within container 12, but a standard cover 16 is used having opening 24, the grommet 30 can be formed without a hole 48. Preferably, for ease of manufacture, the molds for grommet 30 include at least one provisional hole 48a, extending partially through the grommet, which can be readily completed into a hole 48 as needed for a particular application. Where hole 48 is used, grommet 30 is, for example, given a slit 50 from hole 48 to the closest side of grommet 30, as by a knife cut, to allow the power cord to enter hole 48. In making slit 50 it has been found to be advantageous that no material is removed from grommet 30. Further, to assist in proper fluid sealing against the power cord, hole 48 preferably includes grip ledge 52 integrally formed therein to closely engage the power cord.

In assembly of sump arrangement 10, the power cord, if present, is first inserted through opening 24 and then into hole 48 via slit 50. Thereafter (or initially if no power cord is present), reverse tapered portion 40 of grommet 30, being sufficiently compressible due to the material of its construction and/or recesses 46, is inserted into opening 24 from bottom surface 42 toward its top surface 32, with flange 36 serving to limit that insertion. Thereafter, grommet 30 is retained within opening 24 by sandwiching the periphery of that opening between flange 36 and reverse tapered portion 40. Preferably, the compressibility of reverse tapered portion 40 and durability of material selected for grommet 30 are such that grommet 30 can be repeatedly removed from cover 12 when desired and reused.

In operation or testing of sump arrangement 10, when higher fluid pressures are applied to container 12, the fluid enters recesses 46 and exerts force against bottom surface 42 such that reverse tapered portion 40 is forced to flex radially outwardly and expand its radial dimension. When so expanded it is believed to also be urged upwardly against the periphery of opening 24. As a result, the present invention has been found to form a tighter fluid seal against opening 24 which withstands even flexing of cover 16 under that fluid pressure.

Although the present invention has been described above with respect to specific embodiments, that was done by way of illustration and example only and not as a limitation to invention. Those of ordinary skill in the art will now realize that within the present invention numerous other modifications and adaptations of specific embodiments can be made. For example, preferred embodiments have been described in detail with respect to sump arrangements, but are equally applicable to sewage or other plumbing arrangements. Further, the present invention can be applicable to fluids of both a liquid or gaseous nature. Accordingly, the spirit and scope of the present invention are limited only by the terms of the claims below.

What we claim is:

1. An apparatus comprising:
   a container for receiving fluid,
   an electrical device, mounted within the container, having a cord for supplying electric power to the device from a source of electricity outside of the container,
   a cover for sealing fluid within the container,
   an opening in the cover which permits the cord to pass through the cover,
   a grommet for receiving therein the cord and closing the opening, and
   the grommet having a reverse taper portion,
   the reverse tapered portion being insertable into the opening,
   the reverse tapered portion being expandable when subjected to fluid pressure from within the container so as to form a tighter seal against the opening,
   the reverse tapered portion being removably insertable within the opening,
   the reverse tapered portion including a plurality of recesses therein which are accessible to fluid under pressure within the container, and
   the grommet having a top surface and a bottom surface, the recesses extending from the bottom surface toward the top surface, and the recesses being tapered to be larger in dimension at the bottom surface.

2. The apparatus according to claim 1 wherein the reverse tapered portion is formed to flex outwardly from the center of the bottom surface when subjected to the fluid pressure.

3. The apparatus according to claim 1 wherein the grommet includes a hole therethrough for receiving the cord and a cut slit from the side of the grommet to the hole for permitting the cord to be inserted into the hole.

4. The apparatus according to claim 3 wherein the lateral dimensions of a length of the reverse tapered portion of the grommet exceed the lateral dimensions of the opening and the grommet is formed from elastomeric material which is sufficiently compressible to allow the reverse tapered portion of the grommet to be fully inserted into the opening.

5. The apparatus according to claim 4 wherein the grommet flexes outwardly more in response to more fluid pressure being applied thereto.

6. The apparatus according to claim 4 wherein the grommet includes a flange at said top surface that limits insertion of the grommet into the opening.

7. A grommet, for insertion into an opening in the cover of a sewage or sump basin to seal against fluid flow through the cover, comprising a top surface and a bottom surface spaced apart along a longitudinal axis, a flange at the top surface extending radially outward from the longitudinal axis and dimensionally larger than the opening so as to restrict passage of the grommet through the opening, a waist portion between the top surface and the bottom surface which is dimensioned for insertion into the opening, a reverse tapered portion between the waist portion and the bottom surface which extends radially outward past the waist portion with respect to the longitudinal axis and is compressible to permit insertion into the opening but resistive of removal from the opening, and recesses in the bottom surface which are responsive to fluid pressure within the sump basin to allow the reverse tapered portion to extend further radially outwardly from the longitudinal axis.

8. An apparatus comprising:
   a container for receiving fluid,
   an electrical device, mounted within the container, having a cord for supplying electric power to the device from a source of electricity outside of the container,
   a cover for sealing fluid within the container,
   an opening in the cover which permits the cord to pass through the cover,
   a grommet for receiving therein the cord and closing the opening, and
   the grommet having a reverse taper portion,
   the reverse tapered portion being insertable into the opening,
   the reverse tapered portion being expandable when subjected to fluid pressure from within the container so as to form a tighter seal against the opening,
   the reverse tapered portion being removably insertable within the opening,
   the reverse tapered portion including a plurality of recesses therein which are accessible to the fluid pressure within the container.

* * * * *